United States Patent
Van Der Hoek

(10) Patent No.: US 11,835,406 B2
(45) Date of Patent: Dec. 5, 2023

(54) OPTICAL FIBER SENSING DEVICE HAVING A SYMMETRIC OPTICAL FIBER ARRANGEMENT

(71) Applicant: Compass Photonics B.V., Rotterdam (NL)

(72) Inventor: Marinus Jacobus Van Der Hoek, Rotterdam (NL)

(73) Assignee: Compass Photonics B.V., Rotterdam (NL)

(*) Notice: Subject to any disclaimer, the term of this patent is extended or adjusted under 35 U.S.C. 154(b) by 391 days.

(21) Appl. No.: 17/293,338

(22) PCT Filed: Nov. 12, 2019

(86) PCT No.: PCT/NL2019/050736
§ 371 (c)(1),
(2) Date: May 12, 2021

(87) PCT Pub. No.: WO2020/101484
PCT Pub. Date: May 22, 2020

(65) Prior Publication Data
US 2022/0011180 A1 Jan. 13, 2022

(30) Foreign Application Priority Data
Nov. 13, 2018 (NL) ..................... 2021989

(51) Int. Cl.
*G02B 6/36* (2006.01)
*G01L 1/24* (2006.01)

(52) U.S. Cl.
CPC ............ *G01L 1/242* (2013.01); *G02B 6/3616* (2013.01)

(58) Field of Classification Search
CPC ....... G02B 6/3616; G01L 1/242; G01L 5/166; G01L 19/04
See application file for complete search history.

(56) References Cited

U.S. PATENT DOCUMENTS

| 5,140,155 A | * | 8/1992 | Carome ................ G01P 15/093 |
| | | | 250/227.21 |
| 10,113,862 B2 | * | 10/2018 | Wakahara ............... G01B 11/18 |
| 10,551,255 B2 | * | 2/2020 | Matthijssen .......... G01L 5/0033 |
| 2013/0139606 A1 | | 6/2013 | Swinehart et al. |

FOREIGN PATENT DOCUMENTS

| EP | 2990755 A1 | 3/2016 |
| WO | 2009114955 A1 | 9/2009 |

OTHER PUBLICATIONS

International Search Report dated Jan. 15, 2020 for PCT/NL2019/050736.

* cited by examiner

*Primary Examiner* — Daniel Petkovsek
(74) *Attorney, Agent, or Firm* — Suiter Swantz pc llo

(57) ABSTRACT

The invention relates to an optical fiber sensing device (9), comprising a base (1), an actuator (3) having an actuator axis (X), an elastic hinge (2) connecting the actuator to the base, allowing the actuator to move or deflect in a movement plane (D) with respect to the base, a pair of optical fiber portions (4) extending in the movement plane, contacting the actuator in a pair of contacting positions (11), wherein the actuator (3) comprises a symmetry plane (S), wherein the pair of optical fiber portions (4) are symmetrically arranged with respect to the symmetry plane, such that the movement of the actuator causes a proportional or equal change in strain in the optical fiber portions (4).

22 Claims, 5 Drawing Sheets

OPTICAL FIBER SENSING DEVICE HAVING A SYMMETRIC OPTICAL FIBER ARRANGEMENT

FIELD OF THE INVENTION

The present invention relates to an optical fiber sensing device, comprising:
a base,
an actuator connected to the base and having an actuator axis,
an elastic hinge connecting the actuator to the base, wherein the elastic hinge allows the actuator to move or deflect in a movement plane with respect to the base from an unmoved state to a moved state,
a pair of optical fiber portions extending in the movement plane from the base parallel to the actuator axis in the unmoved state, the pair of optical fiber portions contacting the actuator in multiple contacting positions, wherein the pair of optical fiber portions are pre-strained and the optical fiber portions comprise light modulation structures.

BACKGROUND OF THE INVENTION

For various reasons, mechanical parameters like displacement, vibrations or angular movements of objects are needed. These parameters can be measured using e.g. one or more Fibre Bragg gratings (FBG's) bonded to a substrate, such as a metallic bending beam. If, for instance, the beam is to be used to measure the deflection at the tip of the beam with high accuracy, the required width or thickness of the beam to achieve the required accuracy might be such that a large force is required to deflect the tip of the beam. This effect can introduce intolerable errors in the measured tip displacement and distortion of the original deflection.

For a given sensitivity of the strain sensors, the beam needs to have an appropriate thickness to achieve the required accuracy in the measured deflection. The stiffness of the beam scales to the third power of its thickness, resulting in a high force to deflect the beam. Strain sensors at both sides of the beam are required to compensate for thermal expansion of the beam. Deflection of the tip of the beam introduces a curved shape of the beam.

By using an elastic hinge, the force required from the external measurand to deflect the beam is greatly reduced, and is independent of the beam thickness. This enables to increase the beam thickness for increased accuracy of the measurement while conserving a low force to deflect the beam.

Optical fiber sensing devices using the above principle are known from the prior art. For instance, WO 2009/114955 A1 discloses an optical measuring element for measuring forces in at least one direction. The measuring element has a single-piece structure comprising an outside wall and notches introduced therein, wherein the notches define more or less elastically flexible zones in the structure and constitute the only connection between a first and a second region of the structure. For optical distance measurements between the two regions of the structure, one or more optical fibers are each attached with one end thereof to a region of the structure such that close to the ends reflective surfaces are located, which are firmly connected to another region. According to the disclosure, the optical fibers are disposed on the outside wall. In addition, according to the disclosure each notch comprises parallel edges.

EP 2990755 A1 discloses a strain sensor and a method for manufacturing a strain sensor. A plurality of protruding supports is provided in a base. An optical fiber is wound around the supports. The optical fiber comprises parts aligned with different directions between the supports. Fixing materials fix the optical fiber to the supports in a state in which tension is applied to fiber parts between the supports.

US 2013/139606 A1 furthermore discloses optical fiber anchors accomplishing low creep confinement or fixing of a section of optical fiber in an assembly compact enough to be used conveniently as an anchor or as an enabling part of a strain or temperature sensor while retaining low optical losses and the original buffer coating to prevent the fiber from being exposed to abrasion and other influences that could lead to breakage. A rigid body is used that is mechanically stiff and hard enough to prevent said fiber from cutting into it or distorting said medium or substrate when subjected to stress, even over a long period of time.

A problem with the known optical fiber sensing devices, however, is that measurement accuracy is compromised due to temperature differences: a variation of the beam temperature will introduce a change in its dimensions via thermal expansion of the beam material—and thus in the signal as measured by the FBG. This can be solved by bonding a FBG to both sides of the beam. This method can be used to eliminate the influence of temperature on the measurement result, assuming the bending beam to have the same temperature at both surfaces to which the FBGs are bonded. Especially this last condition is difficult to meet in e.g. environments with varying temperature, also in view of the thermal mass of the beam introduced by the thickness of the bending beam needed for high-accuracy measurements of e.g. beam tip deflection.

OBJECT OF THE INVENTION

An object of the invention is therefore to provide an optical fiber sensing device, wherein measurement inaccuracies due to temperature differences are eliminated.

A further object of the invention is to provide an optical fiber sensing device, wherein high sensitivity is achieved with low stiffness.

An even further object of the invention is to provide an optical fiber sensing device, wherein optimal use is made of the energy relationship between the two fibers of the pair of optical fiber portions.

DESCRIPTION OF THE INVENTION

Hereto, according to the invention, an optical fiber sensing device is provided, characterized in that in the unmoved state the actuator comprises a symmetry plane perpendicular to the movement plane, wherein the pair of optical fiber portions are symmetrically arranged with respect to the symmetry plane, such that the movement or deflection of the actuator causes a change in strain in one of the optical fiber portions and a proportional or equal change in strain of opposite sign in the other optical fiber portion.

The above arrangement provides compensation of the influence of temperature on the measurement results of the optical fiber sensing device. Due to the (proportional or equal) opposite sign of the change in the strain of the opposite optical fiber portions, the optical fiber sensing device provides a highly advantageous temperature-compensated differential sensing principle.

Furthermore, high sensitivity is thus achieved with low stiffness.

Additionally, optimal use is made of the energy relationship between the two fibers of the pair of optical fiber portions due to identical pre-straining.

In the context of the present patent application 'symmetric' should generally be understood as: the actuator is symmetric with respect to the symmetry plane, the pair of contacting positions are arranged at equal axial positions along the actuator axis, the pair of optical fiber portions are arranged at equal distances from the symmetry plane, having similar orientations, and the optical fiber portions as such are identical, having identical pre-straining.

The pre-straining furthermore advantageously allows tuning or altering the characteristics of the light modulation structures, for instance the FBG wavelength, in or with respect to a relaxed state.

An embodiment relates to an aforementioned optical fiber sensing device, wherein the actuator axis extends away from the base and the pair of optical fiber portions extends parallel to the actuator axis.

An embodiment relates to an aforementioned optical fiber sensing device, wherein the elastic hinge is shaped to provide a gradual, smooth transition to the base on the one hand and the actuator on the other hand, such as by having rounded (convex) sides.

An embodiment relates to an aforementioned optical fiber sensing device, wherein the light modulation structures are arranged to not coincide with the contacting positions, otherwise the performance of the light modulation structures may become unreliable.

An embodiment relates to an aforementioned optical fiber sensing device, wherein the light modulation structures comprise Fiber Bragg gratings (FBG). In some situations the optical fiber sensing device can be used in harsh environments, such as environments with electromagnetic interference. By using FBG's, the optical fiber sensing device offers immunity to electromagnetic interference and galvanic isolation between the optical fiber sensing device and read-out equipment.

An embodiment relates to an aforementioned optical fiber sensing device, wherein one or both of the pair of optical fiber portions are suspended in a liquid. For instance when working with chemicals, a chemically responsive material may be mounted between the base and the tip of the actuator, with the said material responding to the parameter of interest with a dimensional change, thereby actuating the tip of the actuator. Examples of these chemical parameters are liquids (including e.g. water, oil, acids et cetera). However, it is also conceivable that measurements are made associated with all sorts of gasses. When one of the pair of optical fiber portions is used, the optical fiber sensing device can be used for detection purposes, wherein the use of two of the pair of optical fiber portions can used for general (use) purposes.

An embodiment relates to an aforementioned optical fiber sensing device, wherein the actuator is an integrally formed or monolithic body to obtain predictable thermal expansion and mechanical performance of the actuator.

An embodiment relates to an aforementioned optical fiber sensing device, wherein the actuator is made of non-magnetic materials or has a coating of non-magnetic materials, such as non-magnetic metals or plastics for electrical applications and specific high-voltage environments.

An embodiment relates to an aforementioned optical fiber sensing device, wherein a piezoelectric coating is applied to the elastic hinge or pair of optical fiber portions for additional measurements of for instance mechanical force or vibrations.

An embodiment relates to an aforementioned optical fiber sensing device, wherein the one of the pair of optical fiber portions and the other of the pair of optical fiber portions are part of a single optical fiber, wherein the single optical fiber comprises a third optical fiber portion connecting the pair of optical fiber portions between the pair of contacting positions. Therein, the third optical fiber portion running responds to temperature only. This offers the basic principle of compensation of the influence of temperature on the measurement results of the optical fiber sensing device.

An embodiment relates to an aforementioned optical fiber sensing device, wherein the actuator comprises a rounded, convex or bell-shaped actuator portion and the third optical fiber portion runs over the rounded actuator portion to connect the pair of optical fiber portions between the pair of contacting positions.

An embodiment relates to an aforementioned optical fiber sensing device, wherein the actuator width (W1) is larger than the elastic hinge width (W2), being 5-30, preferably 10-20, times the elastic hinge width (W2), to attain optimal stiffness/sensitivity ratios.

An embodiment relates to an aforementioned optical fiber sensing device, wherein the elastic hinge connects to the base under an angle different from 90°, such as 45°. Thus, An embodiment relates to an aforementioned optical fiber sensing device, wherein two elastic hinges are provided to connect the actuator to the base, wherein the two elastic hinges are positioned on opposite sides of the actuator axis. Thus, it is possible to further tune the direction of measurements.

An embodiment relates to an aforementioned optical fiber sensing device, wherein one of the pair of optical fiber portions is arranged perpendicular to the symmetry plane and the other one of the pair of optical fiber portions is arranged in the symmetry plane or parallel to the symmetry plane, such that the pair of optical fiber portions are arranged perpendicular to each other.

Preferably, the elastic hinges and the actuator are configured to allow the strain created in one of the optical fiber portions due to movement to be attenuated or amplified in the other of the pair of optical fiber portions.

An embodiment relates to an aforementioned optical fiber sensing device, wherein:
- the elastic hinge allows the actuator to deflect in a first movement plane with respect to the base, as well as a second movement plane, perpendicular to the first movement plane,
- a first pair of optical fiber portions extends in the first movement plane, the first pair of optical fiber portions being arranged on opposite sides of the actuator axis and contacting the actuator in a first pair of contacting positions on opposite sides of the actuator axis,
- a second pair of optical fiber portions extends in the second movement plane, the second pair of optical fiber portions being arranged on opposite sides of the actuator axis and contacting the actuator in a second pair of contacting positions on opposite sides of the actuator axis,
- the optical fiber sensing device comprises a first symmetry plane perpendicular to the first movement plane, wherein the first pair of optical fiber portions are symmetrically arranged with respect to the first symmetry plane, such that a movement of the actuator in the first movement plane causes a change in strain in one of the first pair of optical fiber portions and a proportional or equal change in strain of opposite sign in the other of the first pair of optical fiber portions, and the optical fiber sensing device comprises a second symmetry plane perpendicular to the second movement plane, wherein the second pair of optical fiber portions are symmetrically arranged with respect to the second symmetry plane, such that a movement of the actuator in the second movement plane causes a change in strain in one of the second pair of optical fiber portions and a proportional or equal change in strain of opposite sign in the other of the second pair optical fiber portions.

Thus, measurements in two orthogonal planes or directions are made possible.

An embodiment relates to an aforementioned optical fiber sensing device, wherein:

the elastic hinge allows the actuator to deflect in a third movement plane with respect to the base, perpendicular to the first and second movement planes, a third pair of optical fiber portions extends in the third movement plane, perpendicular to the actuator axis, the third pair of optical fiber portions being arranged at spaced-apart positions along the actuator axis and contacting the actuator in a third pair of contacting positions at spaced-apart positions from the actuator axis, the optical fiber sensing device comprises a third symmetry plane perpendicular to the first and second movement planes, wherein the third pair of optical fiber portions are symmetrically arranged with respect to the third symmetry plane, such that a movement of the actuator in the third movement plane causes a change in strain in one of the third pair of optical fiber portions and a proportional or equal change in strain of opposite sign in the other of the third pair of optical fiber portions.

Thus, measurements in three orthogonal planes or directions are made possible.

Alternatively, to measure in three orthogonal planes or directions, the third pair of optical fiber portions is omitted and instead an optical fiber portion is attached to the actuator tip, arranged to be aligned with the actuator axis. Preferably, the optical fiber portion is provided with temperature-compensated strain measurement means to measure temperature-compensated strain.

Another aspect of the invention relates to an optical fiber sensing system comprising one or more aforementioned optical fiber sensing devices.

An embodiment relates to an aforementioned optical fiber sensing system, comprising one or more light sources for transmitting light through the pair of optical fiber portions.

An embodiment relates to an aforementioned optical fiber sensing system, wherein multiple optical fiber sensing devices are connected in series, wherein multiple pairs of optical fiber portions are part of a single optical fiber, wherein the single optical fiber is connected to a single light source.

An embodiment relates to an aforementioned optical fiber sensing system, comprising a frame that encloses the optical fiber sensing device at least in the movement plane.

BRIEF DESCRIPTION OF THE DRAWINGS

The present invention will be explained hereafter with reference to exemplary embodiments of an optical fiber sensing device according to the invention and with reference to the drawings. Therein.

DETAILED DESCRIPTION

Figure 1:
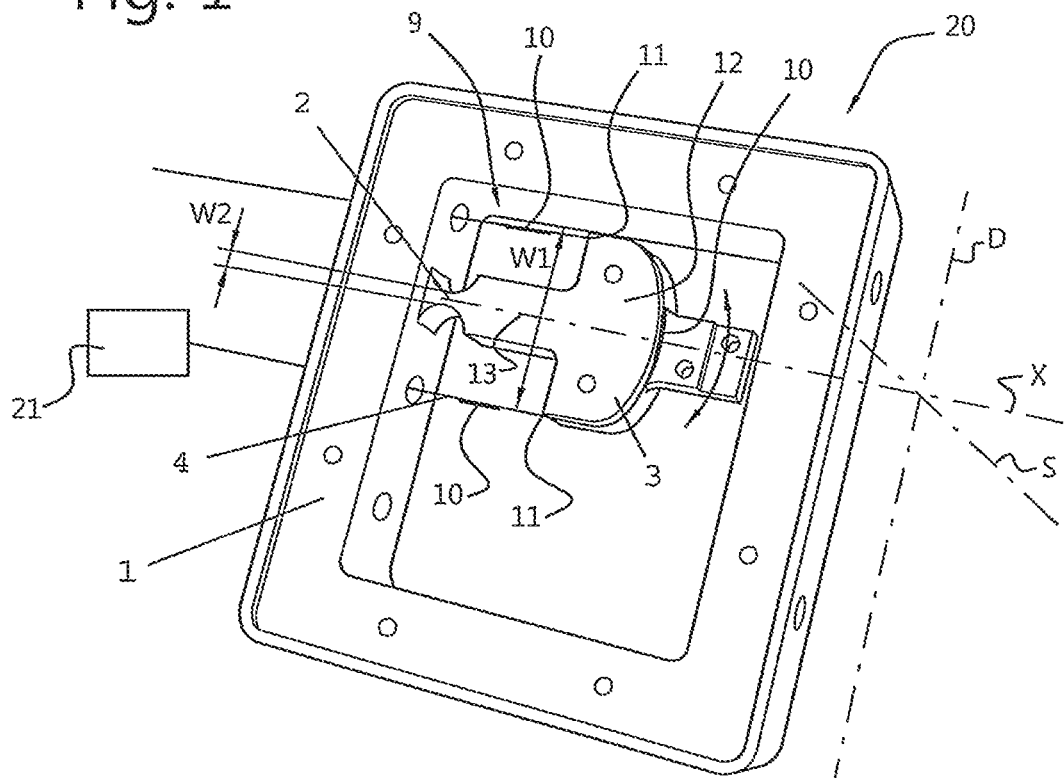
FIG. 1 shows a first exemplary embodiment of an optical fiber sensing device according to the invention, wherein the pair of optical fiber portions are part of a single optical fiber.

FIGS. 1-5g will be discussed in conjunction. FIG. 1 shows an optical fiber sensing device 9, comprising a base 1 and an actuator 3 extending away from the base along an actuator axis X. The actuator 3 preferably is an integrally formed or monolithic body.

An elastic hinge 2 connects the actuator 3 to the base 1. The elastic hinge 2 allows the actuator to deflect in a movement plane D with respect to the base 1 from an unmoved state to a moved state (not shown). The elasticity of the elastic hinge 2 is preferably achieved by providing relatively low bending stiffness in the movement plane D, and relatively high(er) stiffness in planes perpendicular to the movement plane D. A pair of optical fiber portions 4 is shown extending in the movement plane D from the base 1 parallel to the actuator axis X in the unmoved state. The optical fiber portions 4 are arranged on opposite sides of the actuator axis X and contact the actuator in a pair of contacting positions 11 on opposite sides of the actuator axis X. The optical fiber portions 4 are identically pre-strained.

The actuator 3 comprises a symmetry plane S perpendicular to the movement plane D. The actuator 3 and the pair of optical fiber portions 4 are symmetrically arranged with respect to the symmetry plane S, such that the movement of the actuator 3 causes a change in strain in one of the optical fiber portions 4 and an equal change in strain of opposite sign in the other optical fiber portion 4. Although the invention seeks to provide symmetry of the actuator 3 and the optical fiber portions 4, the skilled person will understand that absolute symmetry is not always required and small deviations are possible regarding the design of the actuator 3 and optical fiber portions 4, while still achieving the advantages of the invention.

FIG. 1 in fact shows an optical fiber sensing system 20 comprising one optical fiber sensing devices 9, but multiple optical fiber sensing devices 9 can also be provided, comprising one or more light sources 21 for transmitting light through the pair of optical fiber portions 4. Multiple optical fiber sensing devices 9 can be connected in series, wherein multiple pairs of optical fiber portions 4 are part of a single optical fiber 6, wherein the single optical fiber 6 is connected to a single light source 21. FIG. 1 furthermore shows the frame 1 forming the base 1 that encloses the optical fiber sensing device 9 at least in the movement plane D. The frame 1 may be rectangular, but could also have other shapes. The frame 1 could also have the form of a (e.g. cubical) housing, essentially fully encompassing the optical fiber device 9.

The optical fiber portions 4 as shown furthermore comprise light modulation structures 10 in the form of Fiber Bragg gratings (FBG). The light modulation structures 10 are arranged to not coincide with the contacting positions 11.

In an embodiment, one or both of the pair of optical fiber portions 4 can also be suspended in a liquid (not shown).

The actuator 3 is preferably made of non-magnetic materials, such as non-magnetic metals or plastics. A piezoelectric coating can be applied to the elastic hinge 2 or pair of optical fiber portions 4.

In FIG. 1, the one of the pair of optical fiber portions 4 and the other of the pair of optical fiber portions 4 are part of a single optical fiber 6. The single optical fiber 6 comprises a third optical fiber portion 5 connecting the pair of optical fiber portions 4 between the pair of contacting positions 11.

The actuator 3 as shown in FIG. 1 comprises a rounded or bell-shaped actuator portion 8 and the third optical fiber portion 5 runs over the rounded actuator portion 8 to connect the pair of optical fiber portions 4 between the pair of contacting positions 11. Alternatively, a gap can be created (not shown) in the actuator portion to suspend the third optical fiber portion 5 "in air".

The actuator 3 has an end portion 12 and a central portion 13, wherein the central portion 13 is connected to the elastic hinge 2 and the end portion 12 is connected to the central portion 13. Therein, the end portion width is larger than the central portion width. The actuator 3 width W1 furthermore is larger than the elastic hinge 2 width W2, being 5-30, preferably 10-20, times the elastic hinge 2 width W2.

FIG. 1 more specifically shows an actuator 3 having a monolithic structure in which an elastic hinge 2 supports an actuator 3, of which its angular position in the plane of the frame or base 1 is changed by the external parameter to be measured.

In the embodiment of FIG. 1, a single optical fibre 6 containing three Fibre Bragg gratings (FBG's) 4,5 runs from a first fixation point 7 in the frame 1, over the preferably rounded actuator 3 surface back to a second fixation point 7 in the frame 1.

The three FBG's 10 are written in the core of the optical fiber 6 and distributed over the length of the optical fiber 6 in such a way that two of the FBG's 10 are positioned approximately halfway the distance between the base or frame 1 and the flat-sided edge of the bell-shaped part (end portion 12) of the actuator 3. During assembly of the optical fiber sensing device 9, the optical fiber 6 spans between the actuator 3 and the frame 1 (i.e. the optical fiber portions 4) are both pre-tensioned to the same level, thus pre-stretching the FBG's 10 in these spans to the same amount. The two pre-stretched FBG's 10 are basically freely suspended in the air and fixed at positions outside of the FBG 10 area, thus conserving the intrinsic optical spectrum of the FBG 10 under excitation of the FBG 10, being a prerequisite for accurate measurement of the FBG 10 spectral properties. As stated before, the FBG's 10 can be suspended in a liquid if the application or the performance requirements dictate so.

By nature of the FBG's 10, the FBG's 10 pre-stretched between the actuator 3 and the frame 1 respond to strain and temperature, while the "middle" FBG 10 running over the end portion 12 responds to temperature only. This offers the basic principle for compensation of the influence of temperature on the measurement results of the optical fiber sensing device 9. Movement of the tip 8 of the actuator 3 by the external parameter to be measured results in a change of the angular position of the actuator 3 and hence in an anti-symmetric variation in the strain of the two FBG's 10 that are placed opposite to each other with respect to the actuator's symmetry plane S. Due to the opposite sign of the change in the strain of the two opposite FBGs, the optical fiber sensing device 9 reflects an FBG-based temperature-compensated differential sensing principle.

Figure 2A:
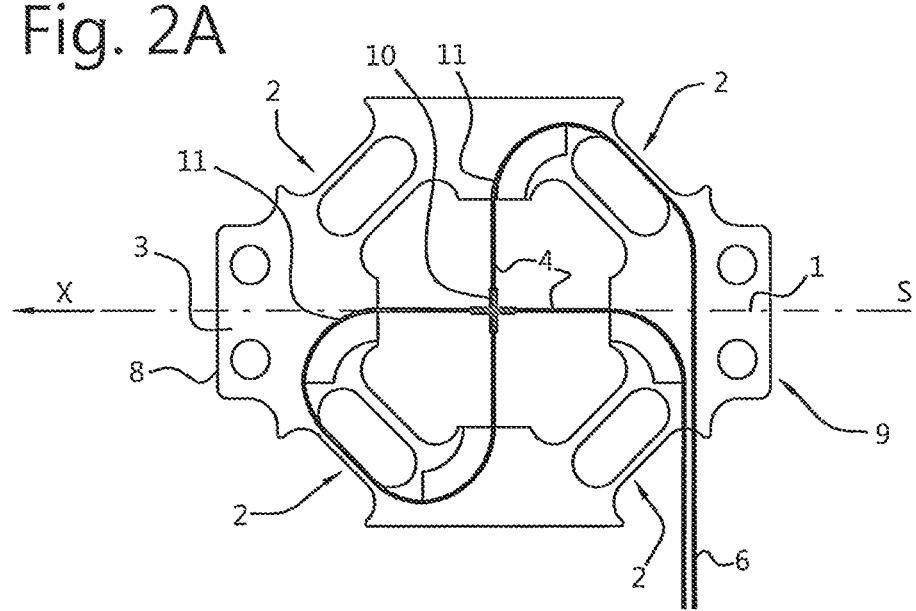
FIGS. 2a-2b show a second exemplary embodiment of an optical fiber sensing device according to the invention.
Figure 2B:
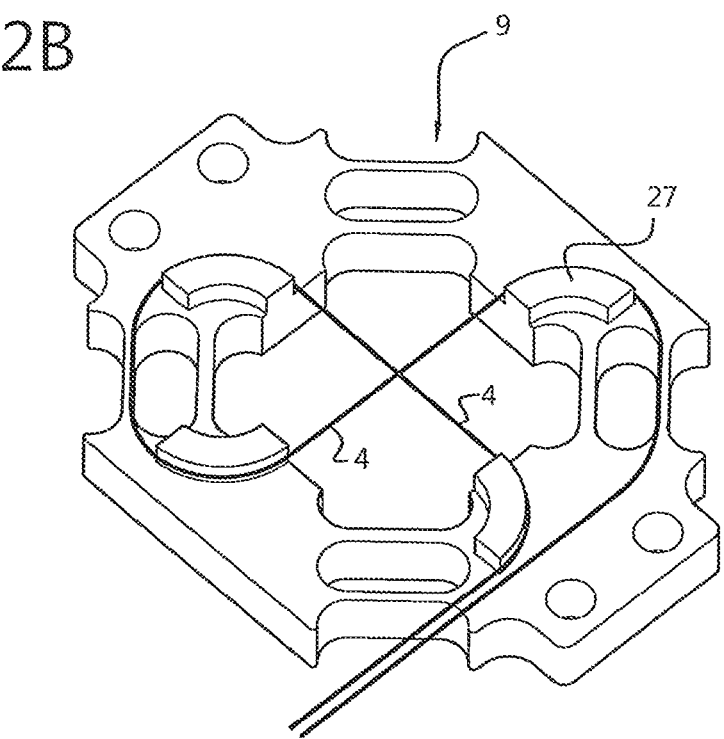

As shown in FIGS. 2a and 2b, in an embodiment the elastic hinge 2 may connect to the base 1 under an angle different from 90°, such as 45°. Therein, two (pair-wise) elastic hinges 2 may be provided to connect the actuator 3 to the base 1, wherein the two elastic hinges 2 are positioned on opposite sides of the actuator axis X. In total, four (pair-wise) elastic hinges 2 may be provided, as shown. The selection of the base 1 is relatively arbitrary and may also be selected to be formed by one of the other actuator segments (four in total, as shown). One of the pair of optical fiber portions 4 is arranged perpendicular to the symmetry plane S and the other one of the pair of optical fiber portions 4 is arranged in the symmetry plane S or parallel to the symmetry plane S, such that the optical fiber portions 4 are arranged perpendicular to each other. The (single) optical fiber 6 can be arranged in the optical fiber sensing device 9 as shown, the optical fiber 6 being bent or arranged along curved elements 27, as shown.

The elastic hinges 2 and the actuator 3 of the second embodiment are essentially configured to allow the strain created in one of the optical fiber portions 4 due to movement to be attenuated or amplified in the other of the pair of optical fiber portions 4. The optical fiber portions 4 are again pre-strained or pre-tensioned at the same level, thus pre-stretching the light modulation structures 10 to the same degree. Another benefit of equal tensioning is the elimination of unwanted effects introduced by for instance moisture or humidity of the wavelength reflected by for instance the FBG. Due to the opposite sign of the resulting change in strain of the two orthogonal optical fiber portions 4 and light modulation structures/FBG's 10, the second embodiment offers an FBG-based temperature-compensated differential sensing principle. Due to the optical fiber portions crossing 'above/below' each other, it is also possible to carry out curvature measurements, i.e. the optical fiber sensing device 9 is 'bent' out of the movement plane D.

Figure 3:
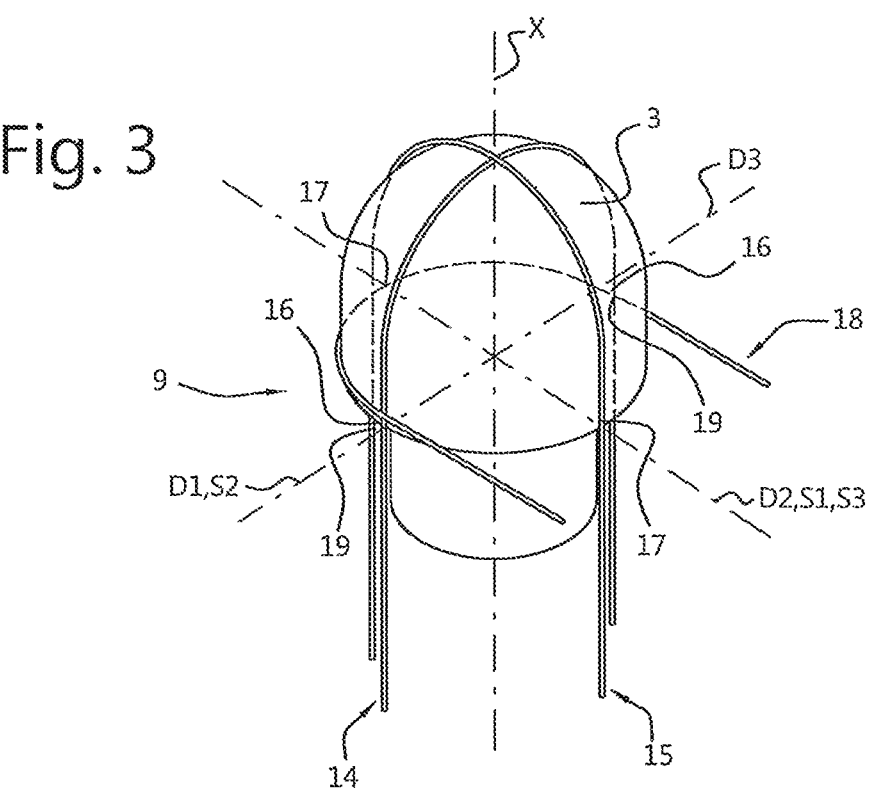
FIG. 3 shows another exemplary embodiment of an optical fiber sensing device according to the invention, based on the first embodiment, wherein three pairs of optical fibers are provided, allowing measurements in three orthogonal planes to take place.

In the embodiment as depicted in FIG. 3 the elastic hinge 2 allows the actuator to deflect in a first movement plane D1 with respect to the base, as well as a second movement plane D2, perpendicular to the first movement plane D1.

A first pair 14 of optical fiber portions extends in the first movement plane D1, the first pair 14 of optical fiber portions being arranged on opposite sides of the actuator axis X and contacting the actuator in a first pair 16 of contacting positions on opposite sides of the actuator axis X.

A second pair 15 of optical fiber portions extends in the second movement plane D2, the second pair 15 of optical fiber portions being arranged on opposite sides of the actuator axis X and contacting the actuator in a second pair 17 of contacting positions on opposite sides of the actuator axis X.

To measure in two orthogonal directions, the optical fiber sensing device 9 as shown in FIG. 3 comprises a first symmetry plane S1 perpendicular to the first movement plane D1, wherein the first pair 14 of optical fiber portions are symmetrically arranged with respect to the first symmetry plane S1, such that a movement of the actuator 3 in the first movement plane D1 causes a change in strain in one of the first pair 14 of optical fiber portions and an equal change in strain of opposite sign in the other of the first pair 14 of optical fiber portions.

The optical fiber sensing device 9 also comprises a second symmetry plane S2 perpendicular to the second movement plane D2, wherein the second pair 15 of optical fiber portions are symmetrically arranged with respect to the second symmetry plane S2, such that a movement of the actuator in the second movement plane D2 causes a change in strain in one of the second pair 15 of optical fiber portions and an equal change in strain of opposite sign in the other of the second pair 15 of optical fiber portions.

To measure in three orthogonal directions, the elastic hinge 2 allows the actuator 3 to deflect in a third movement plane D3 with respect to the base 1, perpendicular to the first D1 and second movement planes D2.

A third pair 18 of optical fiber portions extends in the third movement plane D3, perpendicular to the actuator axis X, the third pair 18 of optical fiber portions being arranged at spaced-apart positions along the actuator axis X and contacting the actuator in a third pair 19 of contacting positions at spaced-apart positions from the actuator axis X.

The optical fiber sensing device 9 comprises a third symmetry plane S3 perpendicular to the first and second movement planes D1, D2, wherein the third pair 19 of optical fiber portions are symmetrically arranged with respect to the third symmetry plane S3, such that a movement of the actuator 3 in the third movement plane D3 causes a change in strain in one of the third pair 19 of optical fiber portions and an equal change in strain of opposite sign in the other of the third pair 19 of optical fiber portions. Alternatively, to measure in three orthogonal planes or directions, the third pair 19 of optical fiber portions 4 is omitted and instead an optical fiber portion is attached to the actuator tip (not shown), arranged to be aligned with the actuator axis X. Preferably, the optical fiber portion is provided with temperature-compensated strain measurement means (not shown) to measure temperature-compensated strain.

FIGS. 4*a*-4*e* show the excitation of the actuator 3 can be the result of many operational modi of the optical fiber sensing device 9.

Figure 4A:
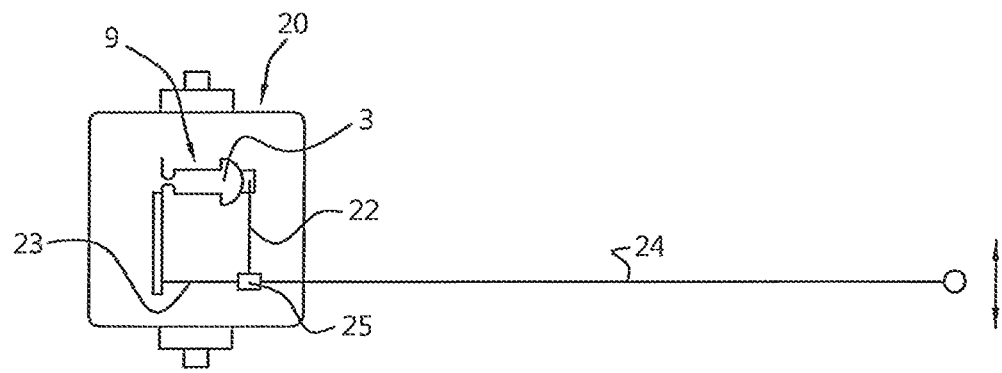
FIGS. 4a-4e show five different operational modi of the first embodiment of the optical fiber sensing device according to the invention.

FIG. 4*a* shows the measurement of a 1D displacement of distant objects or positions. A Glass Fibre Reinforced Plastic (GFRP) main string 24, having a length of for instance 0.5-30 m, or even more, can be used for this. Tensioning of the main string 24 takes place by the inherent elasticity of the string material. Upon distal movement of the right end of the main string 24, the connecting element 26 moves, in turn moving the auxiliary string 23 and the tip string 22, and thus the actuator 3.

Figure 4B:
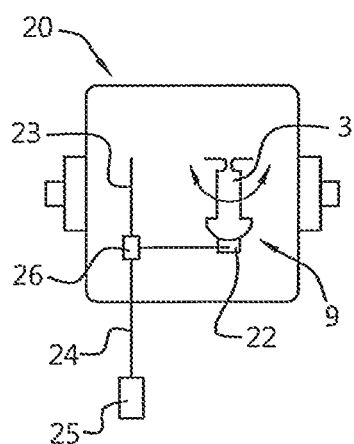

FIG. 4*b* shows a 1D object rotation mode, wherein a heavy mass 25, having a weight of for instance 0.5-10 kg, is suspended from the main string 24 in a pendulum-like construction. Upon horizontal movement of the heavy mass 25, a pendulum motion is initiated. The connecting element 26 then transfers this motion to the actuator 3 via the horizontal tip string 22.

Figure 4C:
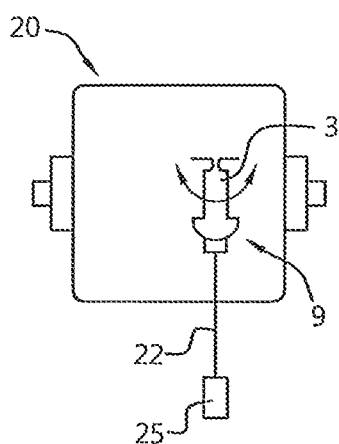

FIG. 4*c* shows a 1D object rotation mode, wherein a lighter mass 25, having a weight of for instance 0.05-0.5 kg, is suspended from the main string 24 in a pendulum-like construction. The lighter mass 25 is directly suspended from the actuator 3 via the tip string 22.

Figure 4D:
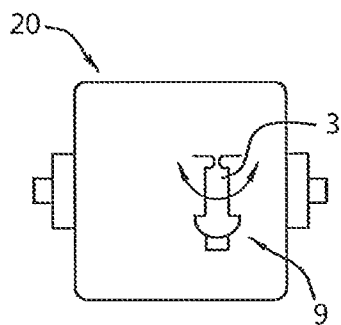

FIG. 4*d* shows a 1D object rotation mode, with the optical fiber sensing device 9 in an 'internal' pendulum mode. The actuator 3 responds to an angular motion by its own mass, although adding an external mass is also conceivable.

Figure 4E:
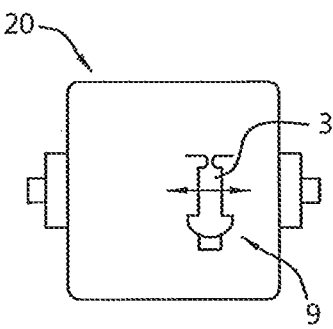
Figure 5A:
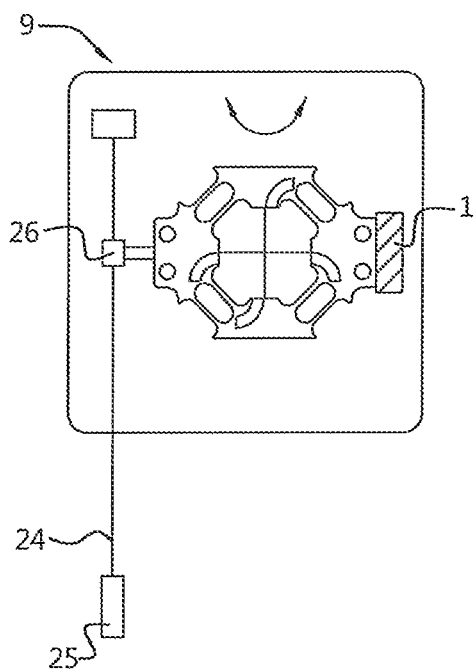
FIGS. 5a-5g show seven different operational modi of the second embodiment of the optical fiber sensing device according to the invention.
Figure 5B:
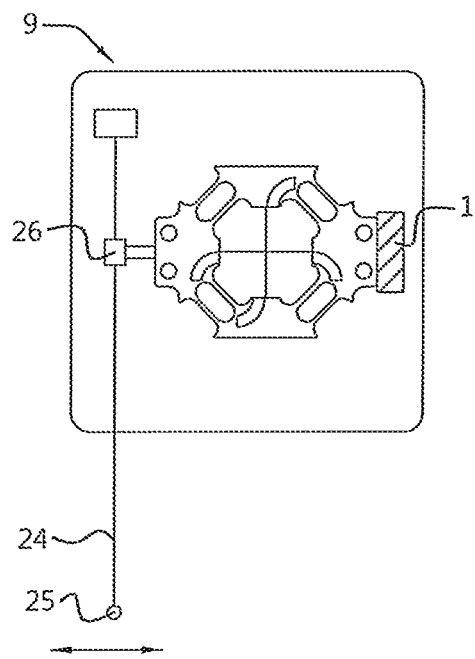
Figure 5C:
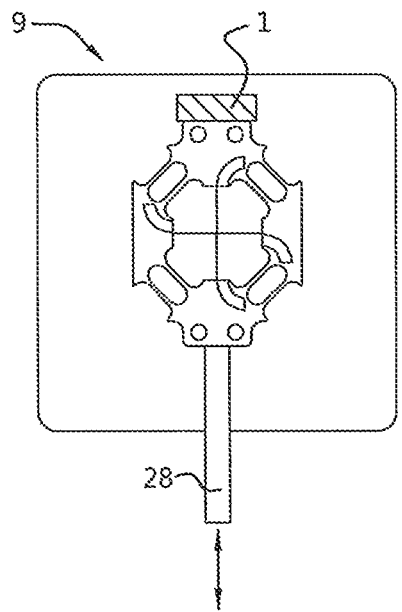
Figure 5D:
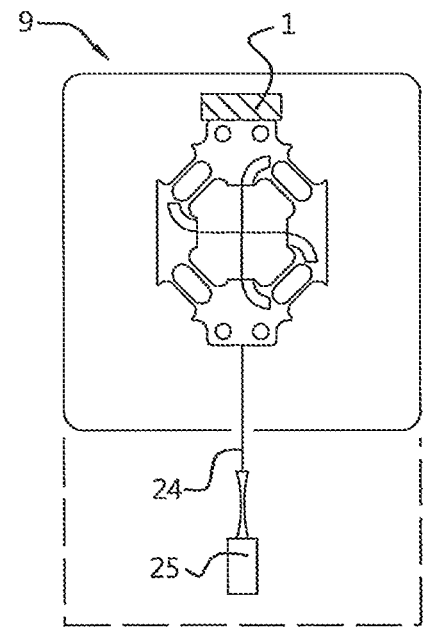
Figure 5E:
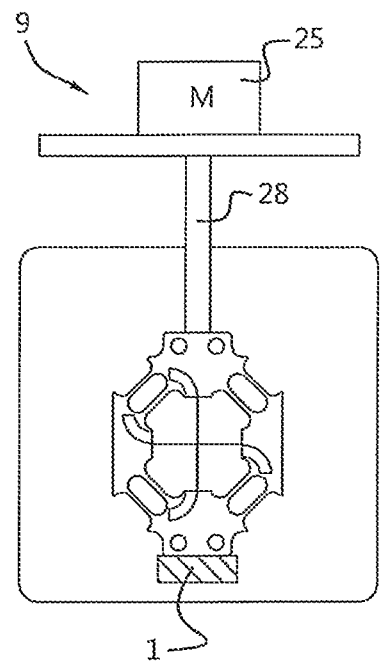
Figure 5F:
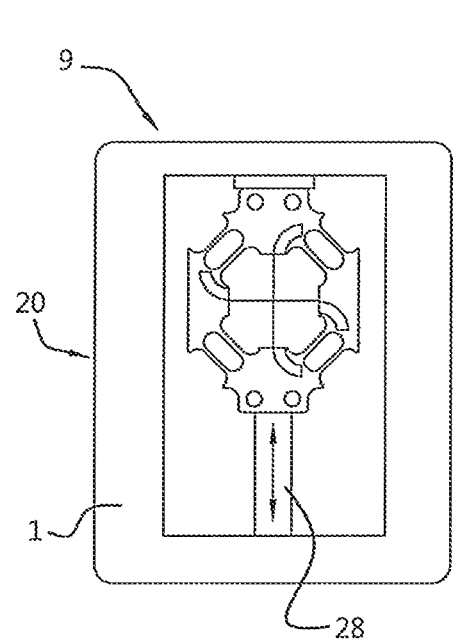
Figure 5G:
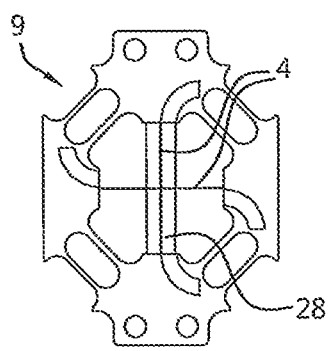

FIG. 4*e* shows a 1D object vibration mode. The actuator 3 responds to lateral vibrations with its own mass (or an external mass).

Having the optical fiber sensing device 9 instrumented with an input and output fiber, two or more optical fiber sensing devices 9 can be connected in series. This is a great benefit with respect to FBG-based sensors having a single-ended fibre connection only. For measurements requiring more than one optical fiber sensing device 9, the single ended optical fiber sensing devices 9 need to be connected to a common node or channel of a readout unit.

As the actuation of the optical fiber sensing device 9 results from angular movement of the actuator 3, any phenomenon capable to introduce such a movement can in principle be detected by the optical fiber sensing device 9 according to the invention. This opens up a whole range of detection possibilities for the following parameters and phenomena:

1. Displacement, introducing an angular deflection of the actuator 3. This application includes—but is not limited to—sensors for detection of very small movements of objects, such a configuration of the optical fiber sensing device 9 could involve e.g. an appropriate stylus, at one side connected to the actuator 3 and with the free end touching the object to be measured.

2. Angular deflection of a tensioned string as a result of the lateral movement of a distal point, as shown in FIG. 4*a*.

3. Rotation of the optical fiber sensing device 9 the gravity vector, as depicted in FIGS. 4*b*-4*d*.

4. Vibration of the optical fiber sensing device 9 in the direction of the angular movement of the tip of the actuator 3, as shown in FIG. 4*e*.

5. Electrical currents, by addition of a ferromagnetic material to the tip of the actuator 3 and a coil of suitable geometry to actuate the tip of the optical fiber sensing device as a result of the magnetic flux as generated by the coil. For these applications, where the original field geometry must be conserved or where the sensor needs to be operated in a high-voltage environment, the optical fiber sensing device 9 can be made out of a non-magnetic metal or a high-engineering plastic.

6. Electrical fields, such as generated by e.g. (high) voltages by application of a suitable responding material to the tip of the actuator 3.

7. Electrical voltages, by placing an element between the monolithic frame 1 of the optical fiber sensing device 9 and the tip of the actuator 3, in which the element responds to the voltage with a change in dimension (resulting from e.g. the piezo-effect) causing a movement of the tip of the actuator 3.

8. Chemicals, by mounting a chemically responsive material between the monolithic frame and the tip of the actuator 3, with the said material responding to the parameter of interest with a dimensional change, thereby actuating the tip 8 of the actuator 3. Examples of these chemical parameters are liquids (including e.g. water, oil, acids et cetera), gasses of different nature, et cetera.

FIGS. 5*a*-5*g* show seven different operational modi of the second embodiment of the optical fiber sensing device 9 according to the invention. FIGS. 5*a*-5*g* respectively show a 1D measurement of the angle between a mass-tensioned string 24 and the optical fiber sensing device 9, a 1D measurement of the displacement of a mass or object 25, a 1D displacement sensor, wherein an auxiliary element 28 is displaced vertically, a 1D vibration mode, with a mass 25 for enhanced sensitivity to vibrations, a weighing sensor for weighing a mass 25, a modulator actuated mode (figures=5*f*: external modulator 28 and FIG. 5*g*: internal modulator 28), wherein the optical fiber sensing device 9 is actuated by a modulator, for instance responding to chemical/thermal/piezo-electric/magnetic/electrostatic interactions.

It should be clear that the description above is intended to illustrate the operation of preferred embodiments of the invention, and not to reduce the scope of protection of the invention. Starting from the above description, many embodiments will be conceivable to the skilled person within the inventive concept and scope of protection of the present invention.

LIST OF REFERENCE NUMERALS

1. Base
2. Elastic hinge
3. Actuator
4. Optical fiber portion
5. Third optical fiber portion
6. Optical fiber
7. Fixation position
8. Actuator tip
9. Optical fiber sensing device
10. Light modulation structure
11. Contacting position
12. End portion
13. Central portion
14. First pair of optical fiber portions
15. Second pair of optical portions
16. First pair of contacting positions
17. Second pair of contacting positions
18. Third pair of optical fiber portions
19. Third pair of contacting positions
20. Optical fiber sensing system
21. Light source
22. Tip string
23. Auxiliary string
24. Main string
25. Mass
26. Connecting element
27. Curved element
28. Auxiliary element
X=Actuator axis
D=Movement plane (D1, D2, D3)
S=Symmetry plane (S1, S2, S3)
W1=Actuator width
W2=Elastic hinge width

The invention claimed is:

1. An optical fiber sensing device, comprising:
a base,
an actuator connected to the base and having an actuator axis (X),
an elastic hinge connecting the actuator to the base, wherein the elastic hinge allows the actuator to move or deflect in a movement plane (D) with respect to the base from an unmoved state to a moved state,
a pair of optical fiber portions extending in the movement plane, the pair of optical fiber portions contacting the actuator in multiple contacting positions, wherein the pair of optical fiber portions are pre-strained and the optical fiber portions (4) comprise light modulation structures, wherein
in the unmoved state the actuator comprises a symmetry plane (S) perpendicular to the movement plane (D), wherein the pair of optical fiber portions are symmetrically arranged with respect to the symmetry plane, such that the movement or deflection of the actuator causes a change in strain in one of the optical fiber portions and a proportional or equal change in strain of opposite sign in the other optical fiber portion.

2. The optical fiber sensing device according to claim 1, wherein the actuator axis (X) extends away from the base and the pair of optical fiber portions extends parallel to the actuator axis.

3. The optical fiber sensing device according to claim 1, wherein the elastic hinge is shaped to provide a gradual, smooth transition from the base to the actuator.

4. The optical fiber sensing device according to claim 1, wherein the light modulation structures (10) are arranged to not coincide with the contacting positions.

5. The optical fiber sensing device according to claim 1, wherein the light modulation structures (10) comprise Fiber Bragg gratings (FBG).

6. The optical fiber sensing device according to claim 1, wherein one or both of the pair of optical fiber portions are suspended in a liquid.

7. The optical fiber sensing device according to claim 1, wherein the actuator is an integrally formed or monolithic body.

8. The optical fiber sensing device according to claim 1, wherein the actuator is made of non-magnetic materials or has a coating of non-magnetic materials.

9. The optical fiber sensing device according to claim 1, wherein a piezoelectric coating is applied to the elastic hinge or pair of optical fiber portions.

10. The optical fiber sensing device according to claim 1, wherein the one of the pair of optical fiber portions and the other of the pair of optical fiber portions are part of a single optical fiber, wherein the single optical fiber comprises a third optical fiber portion connecting the pair of optical fiber portions between the pair of contacting positions.

11. The optical fiber sensing device according to claim 10, wherein the actuator comprises a rounded actuator portion and the third optical fiber portion runs over the rounded actuator portion to connect the pair of optical fiber portions between the pair of contacting positions.

12. The optical fiber sensing device according to claim 1, wherein the actuator (3) width (W1) is larger than the elastic hinge width (W2), being 5-30 times the elastic hinge width (W2).

13. The optical fiber sensing device according to claim 1, wherein the elastic hinge connects to the base (1) under an angle different from 90°.

14. The optical fiber sensing device according to claim 1, wherein two elastic hinges are provided to connect the actuator to the base, wherein the two elastic hinges are positioned on opposite sides of the actuator axis.

15. The optical fiber sensing device according to claim 14, wherein the elastic hinges and the actuator are configured to allow the strain created in one of the optical fiber portions due to movement to be attenuated or amplified in the other of the pair of optical fiber portions.

16. The optical fiber sensing device according to claim 1, wherein one of the pair of optical fiber portions is arranged perpendicular to the symmetry plane (S) and the other one of the pair of optical fiber portions is arranged in the symmetry plane or parallel to the symmetry plane, such that the pair of optical fiber portions are arranged perpendicular to each other.

17. The optical fiber sensing device (9) according to claim 1, wherein:
the elastic hinge allows the actuator to deflect in a first movement plane (D1) with respect to the base, as well as a second movement plane (D2), perpendicular to the first movement plane (D1),
a first pair of optical fiber portions extends in the first movement plane, the first pair of optical fiber portions being arranged on opposite sides of the actuator axis and contacting the actuator in a first pair (16) of contacting positions on opposite sides of the actuator axis, a second pair of optical fiber portions extends in the second movement plane (D2), the second pair of optical fiber portions being arranged on opposite sides of the actuator axis (X) and contacting the actuator in a second pair of contacting positions on opposite sides of the actuator axis (X), the optical fiber sensing device (9) comprises a first symmetry plane (S1) perpendicular to the first movement plane (D1), wherein the first pair of optical fiber portions are symmetrically arranged with respect to the first symmetry plane (S1), such that a movement of the actuator in the first movement plane (D1) causes a change in strain in one of the first pair of optical fiber portions and a proportional or equal change in strain of opposite sign in the other of the first pair of optical fiber portions, and the optical fiber sensing device comprises a second symmetry plane (S2) perpendicular to the second movement plane (D2), wherein the second pair of optical fiber portions are symmetrically arranged with respect to the second symmetry plane (S2), such that a movement of the actuator in the second movement plane (D2) causes a change in strain in one of the second pair of optical fiber portions and a proportional or equal change in strain of opposite sign in the other of the second pair of optical fiber portions.

18. The optical fiber sensing device according to claim 17, wherein:

the elastic hinge allows the actuator to deflect in a third movement plane (D3) with respect to the base, perpendicular to the first (D1) and second movement planes (D2), a third pair of optical fiber portions extends in the third movement plane (D3), perpendicular to the actuator axis (X), the third pair of optical fiber portions being arranged at spaced-apart positions along the actuator axis (X) and contacting the actuator in a third pair of contacting positions at spaced-apart positions from the actuator axis (X), the optical fiber sensing device comprises a third symmetry plane (S3) perpendicular to the first and second movement planes (D1, D2), wherein the third pair of optical fiber portions are symmetrically arranged with respect to the third symmetry plane (S3), such that a movement of the actuator (3) in the third movement plane (D3) causes a change in strain in one of the third pair of optical fiber portions and a proportional or equal change in strain of opposite sign in the other of the third pair of optical fiber portions.

19. An optical fiber sensing system comprising one or more optical fiber sensing devices according to claim 1.

20. The optical fiber sensing system according to claim 19, comprising one or more light sources for transmitting light through the pair of optical fiber portions.

21. The optical fiber sensing system according to claim 19, wherein multiple optical fiber sensing devices are connected in series, wherein multiple pairs of optical fiber portions are part of a single optical fiber, wherein the single optical fiber is connected to a single light source.

22. The optical fiber sensing system according to claim 19, comprising a frame that encloses the optical fiber sensing device at least in the movement plane (D).

* * * * *